(No Model.)
J. R. CRUNKLETON.
BICYCLE SUPPORT.
No. 536,133. Patented Mar. 19, 1895.
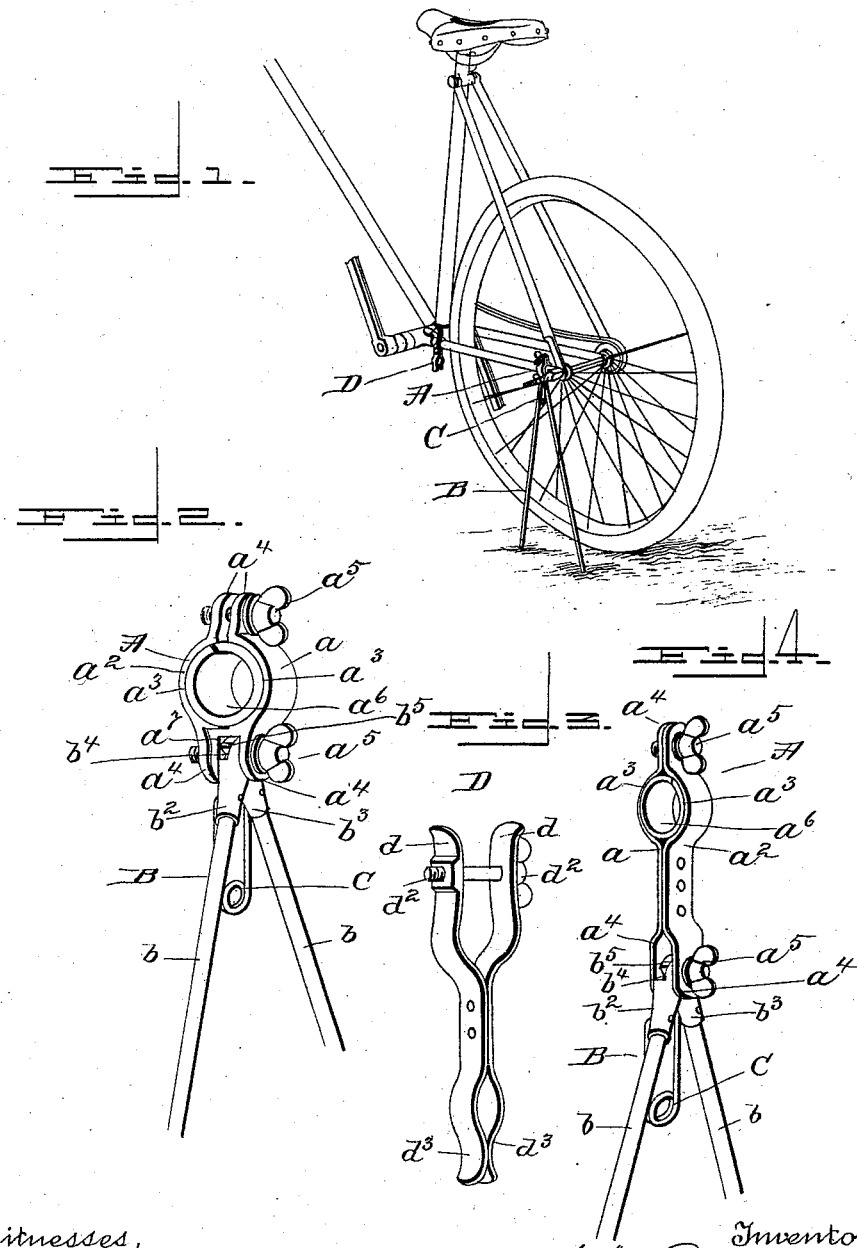

UNITED STATES PATENT OFFICE.

JOHN RUSH CRUNKLETON, OF BALTIMORE, MARYLAND.

BICYCLE-SUPPORT.

SPECIFICATION forming part of Letters Patent No. 536,133, dated March 19, 1895.

Application filed July 11, 1894. Serial No. 517,218. (No model.)

*To all whom it may concern:*

Be it known that I, JOHN RUSH CRUNKLETON, a citizen of the United States, residing at Baltimore, in the State of Maryland, have invented certain new and useful Improvements in Bicycle-Supports, of which the following is a specification.

This invention relates to an attachment for bicycles, in the nature of a support.

The object is to produce a simple and inexpensive device, designed to be attached to and carried upon the frame of a bicycle, in a manner, whereby it may be readily adjusted to serve as a support, in sustaining the machine in an upright position.

With this object in view, the invention consists in a support, the improved combination and arrangement of parts of which will be more fully described and claimed in the appended claim.

The invention is illustrated in the accompanying drawings, forming part of the specification, wherein like letters of reference indicate corresponding parts in the several views, in which—

Figure 1, is a view in perspective, of one embodiment of the invention, it being applied to a safety bicycle, showing the separable attaching head, removably secured upon one of the lower braces of the frame of the machine, the legs pivoted to the head and spread by the attached spring, in a manner to form a support, and a holder, also secured upon the brace of the bicycle frame, and having flared spring clamping jaws, between which the outer ends of the legs are adapted to be held when the machine is in use. Fig. 2, is a view in perspective, of the upper portion of the support, showing the separable attaching head formed of two parts, connected by thumb screws, each part or member having an approximately semi-circular concavity, formed in its inner face, whereby, they are secured in position upon a brace of the bicycle frame, the opening formed by the adjoining concaved faces, having a lining of suitable material, depending lugs, formed integral with one of the members, supporting legs, headed, the heads being pivoted between the lugs, upon the lower thumb screw, and provided with a spring, by which they are forced apart, also with a stop for limiting the action of the spring. Fig. 3, is a view in perspective, of the spring clamping holder. Fig. 4, is a similar view, of a modification, showing the head formed of two equal lengths of strap metal, secured together centrally by rivets, or in any other suitable manner, the metal being bent up, to form lugs at one end, between which the supporting legs are pivoted, the portions near the opposite ends being suitably curved and lined or padded, to encircle the brace of a bicycle, the ends terminating in apertured lugs to receive a clamping screw.

In the drawings, A, represents the separable head of the supporting device, comprising two members $a$, $a^2$, having their inner adjoining faces concaved at $a^3$, to form when combined, an approximately circular opening, and terminating in apertured lugs $a^4$, the apertures being threaded to receive thumb screws $a^5$, by which the head is secured in position, preferably upon the lower brace of the frame of a cycle. The member $a$ of said head, has formed on its lower end, an additional lug $a^7$, the purpose of which will be hereinafter described. If desired, the opening between the members may be provided with a lining, such as a split leather collar $a^6$, to prevent injury to the polish of the brace bar.

B, represents the support proper, comprising duplicate legs $b$, the headed extremities $b^2$, $b^3$, of which, are pivoted upon the thumb screw, in an opening formed between the two lugs $a^4$ $a^7$, whereby when said head is removed the legs will be held in position in one of the members, said thumb screw passing through openings in the lower lugs of the member $a$, of the head. The extremity $b^2$, is slotted at $b^4$, to receive a projecting stud $b^5$, integral with the the headed extremity $b^3$, which serves, as a stop to limit the spread of the legs.

C, represents a spring, having its ends attached to the headed extremities of the supporting legs, by which they are forced apart and retained separated.

D, represents a holder for the outer or free ends of the legs. The holder is removably attached to the brace, upon which the head is secured, by being provided with spring jaws $d$, partially encircling the brace and held by a thumb screw $d^2$. Forming part of this holder and projecting downward therefrom, are spring clamping jaws $d^3$, between which the outer ends of the legs are adapted to be retained, when not in use.

In Fig. 4, of the drawings, a modified form of the attaching head is shown, and differs from that above described, in that the members, comprising the head, are rigidly connected, by being riveted together, about centrally their length, the lower extremities thereof being bent up to form lugs, between which the supporting legs are pivoted, and the opposite or upper ends curved to form a split collar or sleeve, which is adapted to partially or wholly encircle the brace of the bicycle, being secured by a clamping screw or bolt, passing through terminal apertured lugs of the members.

Among the many important advantages of this invention may be mentioned, the extreme simplicity of construction, low cost of manufacture, ease and convenience of application, rapidity of adjustment, and its effectiveness in operation.

Having described the invention, what I claim as new, and desire to secure by Letters Patent, is—

A support for bicycles comprising a separable attaching head consisting of two members having lugs at their upper and lower ends, one of said members having an additional lug formed on its lower end, said members having their adjoining faces concaved to form when combined an approximately circular opening; adjusting screws by which the diameter of the opening may be varied; legs pivoted to one of said members in an opening formed between said lugs, upon one of the adjusting screws, in a manner whereby their independent movement about the screw as a pivotal center is limited; and a spring by which the legs are spread, as specified.

In testimony whereof I have affixed my signature in the presence of two subscribing witnesses.

JOHN RUSH CRUNKLETON.

Witnesses:
 S. JOHN LION,
 HARRY E. GILBERT.